United States Patent [19]
Dordick

[11] Patent Number: 6,107,995
[45] Date of Patent: Aug. 22, 2000

[54] INFLATABLE KEYBOARD

[75] Inventor: Rowan L. Dordick, Briarcliff Manor, N.Y.

[73] Assignee: International Business Machines Corporation, Armonk, N.Y.

[21] Appl. No.: 09/116,482

[22] Filed: Jul. 16, 1998

[51] Int. Cl.$^7$ ........................................................ G06F 1/16
[52] U.S. Cl. .......................... 345/168; 400/472; 400/473; 400/490; 400/491; 400/491.1; 361/680
[58] Field of Search .............................. 345/168; 400/472, 400/473, 490, 491, 491.1; 361/680

[56] References Cited

U.S. PATENT DOCUMENTS

| | | | |
|---|---|---|---|
| 3,663,779 | 5/1972 | Gerlach et al. | 200/302.2 |
| 4,795,888 | 1/1989 | MacFarlane | 235/145 R |
| 5,164,558 | 11/1992 | Huff et al. | 200/83 R |
| 5,459,461 | 10/1995 | Crowley et al. | 341/22 |
| 5,595,449 | 1/1997 | Vitkin | 400/472 |
| 5,616,897 | 4/1997 | Weber et al. | 200/5 A |
| 5,648,771 | 7/1997 | Halgren et al. | 341/22 |
| 5,666,112 | 9/1997 | Crowley et al. | 341/22 |
| 5,691,716 | 11/1997 | Crowley et al. | 341/22 |
| 5,933,320 | 8/1999 | Malhi | 361/680 |
| 6,019,530 | 2/2000 | Lanzetta et al. | 400/491.1 |

*Primary Examiner*—Bipin Shalwala
*Assistant Examiner*—Vincent E. Kovalick
*Attorney, Agent, or Firm*—Whitman, Curtis & Whitham; Stephen C. Kaufman, Esq.

[57] ABSTRACT

An inflatable keyboard having a base and a keypad is provided. The base includes an embedded conduit having apertures or valves extending from a top surface of the base and pressure transducers surrounding the valves. Conductors connect the pressure transducers to an output mounted on the base.

Each aperture or valve and pressure transducer corresponds to and communicates with individual inflatable keys. Each inflatable key forms a separate air tight compartment. The inflatable keys are made of a thin flexible and preferably polymer like material and may be formed on a single premolded sheet which is hermetically sealed to the base in order to form the separate air tight compartments.

During the inflated state, the inflatable keys are in an extended upright position and are rigid enough so that a user can use the inflatable keys for typing thereon. When the inflatable keys are deflated, the inflatable keys are pushed downward toward the base to form a substantially flat surface, which may be folded or rolled up.

20 Claims, 1 Drawing Sheet

INFLATABLE KEYBOARD

BACKGROUND OF THE INVENTION

1. Field of the Invention

The present invention generally relates to an inflatable keyboard and, more particularly, to an inflatable keyboard where each key of the keyboard forms a separate air tight compartment.

2. Background Description

Due to miniaturization of computer circuitry over the years, it is now possible to design, implement and use lap top computers, personal digital assistants (PDAs), calculators and the like. However, a major obstacle in further computer size reduction is no longer the design of the computer circuitry, but instead it is the design and implementation of a compact computer keyboard.

It is difficult to design a compact computer keyboard, without simultaneously affecting the functionality of the keyboard itself. That is, smaller sized computer keyboards typically result in the user having difficultly typing on the computer keyboard. Thus, computer keyboard technology is mainly limited by human and ergonomic factors, such as hand size.

Thus, what is needed is a keyboard that can be compactly stored, while at the same time providing a standard sized keyboard. Such a keyboard would be ergonomically designed to accommodate a user's hand size.

SUMMARY OF THE INVENTION

According to the invention, there is provided an inflatable keyboard. The keyboard comprises a base and a keypad. Embedded within the base is a conduit having apertures extending to a top surface of the base. In embodiments, the apertures may be valves that control the pressure within the keypad. Also embedded within the base are pressure transducers which preferably surround the apertures. Conductors, for example, thin film signal conductors, connect the pressure transducers to an output mounted on the base.

Each aperture and pressure transducer corresponds to and communicates with individual inflatable keys. In preferred embodiments, each inflatable key forms a separate air tight compartment. The inflatable keys are made of a thin flexible and preferably polymer like material. In embodiments, the inflatable keys are formed on a single pre-molded sheet and are hermetically sealed to the base in order to form the separate air tight compartments.

The conduit is connected to an air supply pump at a first end so that air can be pumped through the conduit into the separate air tight compartments of each individual inflatable key.

According to the present invention, when the inflatable keys are inflated, the keyboard acquires a substantially standard shape and size, similar to a conventional keyboard. During the inflated state, the inflatable keys are in an extended upright position and are rigid enough so that a user can use the inflatable keys for typing thereon. When the inflatable keys are deflated, the inflatable keys are pushed downward toward the base to form a substantially flat surface, which may be folded or rolled up.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

It is well understood that the dimensions of the inflatable keyboard of the present invention, including length, width, shape and other variables and quantities specified herein may vary with the type of system contemplated. Therefore, numbers and dimensions specified herein are not to be construed as limitations on the scope of the present invention, but are meant to be merely illustrative of one particular application of the present invention.

Figure 1:
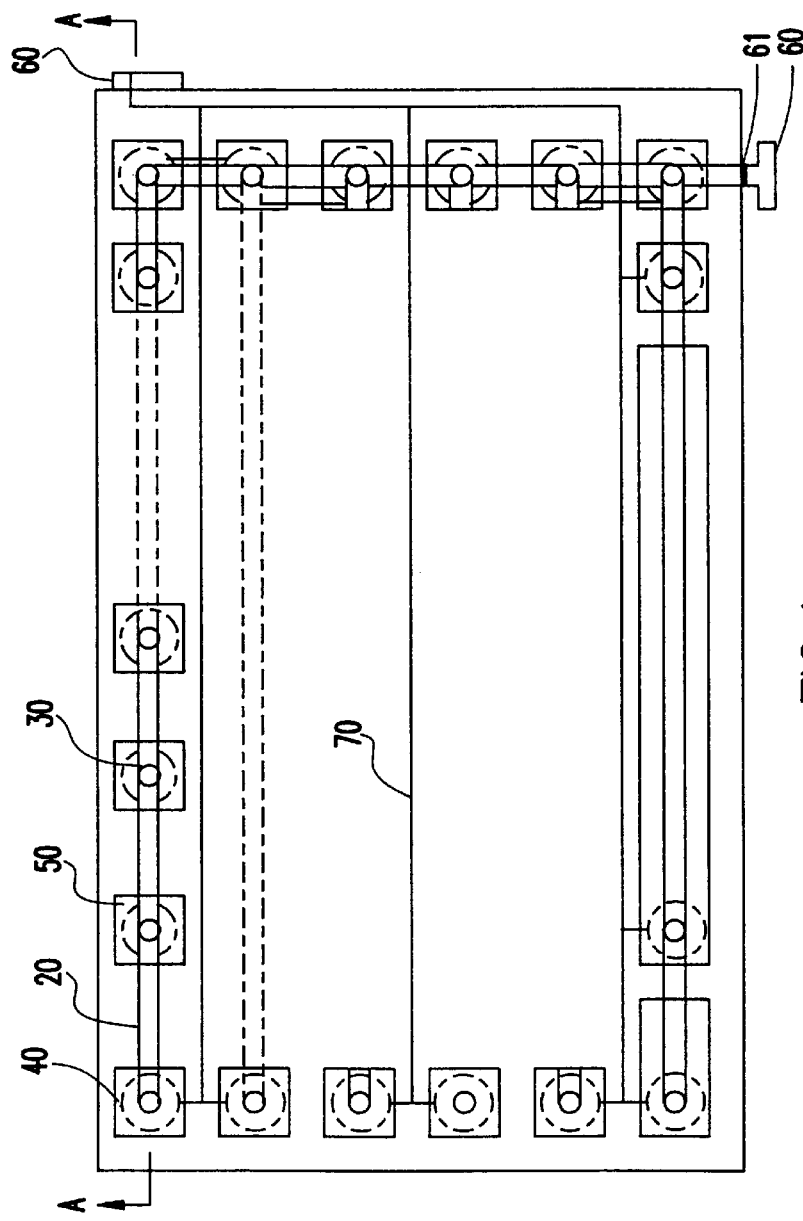
FIG. 1 is top view of a keyboard of the present invention.
Figure 2:
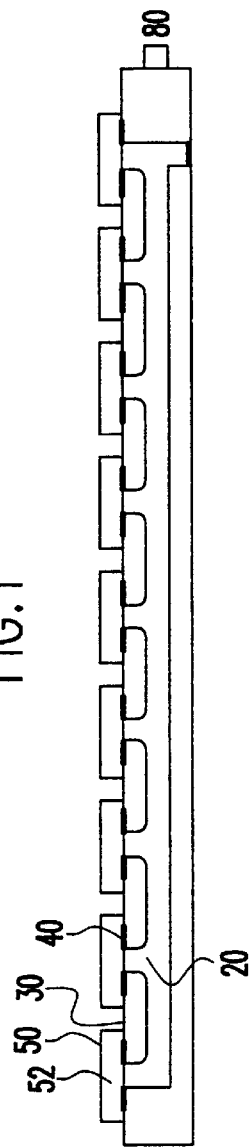
FIG. 2 is a sectional side view of the keyboard of FIG. 1 along line A—A.

Referring now to the drawings, and more particularly to FIGS. 1 and 2, there is shown a keyboard of the present invention. More specifically, FIGS. 1 and 2 show a flexible polymer like base 10 which acts as the base of the keyboard 1. In preferred embodiments, a conduit 20 is embedded into the base 10 in any number of embedding manners and in any number of conduit arrangements in order to allow air or a host of other gases to travel therethrough.

For example, the conduit 20 may be blown or extruded into the base 10 prior to a final curing stage of the base 10. Further, the conduit 20 may be arranged in any number of formations, where the only limitation is that the conduit 20 must communicate with each key of the keyboard, as detailed below. For example, the conduit may be divided into sections so that each section corresponds to a section of the keyboard. However, in preferred embodiments, the conduit 20 is arranged so that the length of the conduit is minimized.

The conduit 20 communicates with a plurality of apertures 30, where each aperture 30 extends to a top surface of the base 10 and corresponds to and communicates with individual inflatable keys 50. In preferred embodiments, each inflatable key 50 forms a separate air tight compartment 52, as discussed in detail below. In further embodiments, the apertures 30 may be valves which control the pressure within each separate air tight compartment 52.

The conduit 20 is connected to an air supply pump 60 at a first end so that air can be pumped through the conduit 20 into the separate air tight compartments 52 of each individual inflatable key 50, via the apertures 30 and, in embodiments, the valves. In further embodiments, the air supply pump 60 may be a compressed air cylinder which supplies compressed gas to the separate air tight compartments 52 of each individual inflatable key 50. A valve 61 may positioned at the connection between the air supply pump 60 and the conduit 20 in order to regulate air or other gases entering and exiting the inflatable keys 50, much like the air valves 30. By pumping air from the air supply pump 60 through the conduit 20 into the separate air tight compartments 52 of each individual inflatable key 50, each individual inflatable key 50 can be separately inflated and deflated.

As further seen in FIGS. 1 and 2, pressure transducers 40 concentrically surround each aperture 30 and, in embodiments, each valve, within each air tight compartment 52. In further embodiments, the pressure transducers 40 may be located anywhere within the respective air tight compartments 52 of the inflatable keys 50. In preferred embodiments, the pressure transducers 40 are thin film strain gauges made of metal, platinum or other conducting polymer like material.

The pressure transducers 40 are connected to thin film signal conductors 70, preferably made of metal or a conducting polymer. The thin film signal conductors 70 are connected to an output 80 and are also preferably embedded in the base 10. The output 80 is connected to an external computer, PDA or the like so that when the user depresses the inflatable keys 50, the pressure transducers 40 are activated which then provide a signal to the output 80, via the thin film signal conductors 70. The output then provides a respective signal to the external computer, PDA or the like.

Preferably, the output 80 and the thin film signal conductors 70 are conventional components currently used in standard keyboard systems. In further preferred embodiments, the pressure transducers 40 and the thin film signal conductors 70 are embedded into the base 10 prior to the final curing of the base 10 and the pressure transducers 40 are controllable to adjust the pressure sensitivity of the inflatable keys 50 after they are depressed.

In preferred embodiments, the inflatable keys 50 have the same shape as conventional keys and are preferably arranged on the keyboard 1 in a standard keypad arrangement. The inflatable keys 50 are made of a thin flexible and preferably polymer like material. In embodiments, the inflatable keys 50 are formed on a single pre-molded sheet which is thinner than that of the base 10. The single premolded sheet is preferably hermetically sealed to the base 10 in order to form the separate air tight compartments 52 corresponding to respective valves 30. In further embodiments, the inflatable keys 50 may be individually molded, extruded or shaped in other conventional manners and individually sealed to the base 10. The inflatable keys 50 may also have integral side supports molded therein, where the integral side supports are thicker than other areas of the inflatable keys 50 and support the inflatable keys 50 when they are inflated.

According to the present invention, when the inflatable keys 50 are inflated, the keyboard 1 acquires a substantially standard shape and size, similar to a conventional keyboard. During the inflated state, the inflatable keys 50 are in an extended upright position and are rigid enough so that a user can use the inflatable keys 50 for typing thereon. In embodiments, the rigidity of the keys may be adjusted (via the valves and air supply pump) to accommodate a user's personal preference, such as, for example, key sensitivity.

When the inflatable keys SO are deflated, the inflatable keys 50 are pushed downward toward the base 10 to form a substantially flat surface. The flattened keyboard may then be folded in numerous ways, such as in halves or thirds, or may even be roll up.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. An inflatable keyboard comprising:
   a base;
   a plurality of inflatable keys arranged on the base, each inflatable key forming a separate air tight compartment; and
   a gas conduit system, the gas conduit system being embedded in the base and communicating with the separate air tight compartments of each inflatable key, wherein each separate air tight compartment is at least individually inflated by the gas conduit system.

2. The inflatable keyboard of claim 1, further comprising a plurality of valves, where each valve has a first end and a second end, the first end of each valve communicating with respective separate air tight compartments of each inflatable key and the second end of each valve connecting to the gas conduit system.

3. The inflatable keyboard of claim 2, further comprising pressure transducers concentrically surrounding each valve within each air tight compartment, the pressure transducers providing a signal to an output in response to depressing the inflatable keys.

4. The inflatable keyboard of claim 3, wherein the pressure transducers are thin film strain gauges made from the group consisting of metal, platinum or conducting polymer.

5. The inflatable keyboard of claim 1, further comprising one of a pump and a compressed air container communicating with the gas conduit system and supplying gas to the separate air tight compartments of each inflatable key in order to inflate the inflatable keys.

6. The inflatable keyboard of claim 1, wherein the inflatable keys have side wall supports.

7. The inflatable keyboard of claim 6, wherein the side wall supports are thicker than other areas of the inflatable keys and support the inflatable keys when they are inflated.

8. The inflatable keyboard of claim 1, wherein each individual inflatable key is made of a flexible polymer material.

9. The inflatable keyboard of claim 1, wherein the base is made of a polymer material.

10. The inflatable keyboard of claim 1, wherein:
    the inflatable keys are formed on a single premolded sheet, and
    the single pre-molded sheet is hermetically sealed to the base in order to form the separate air tight compartments.

11. The inflatable keyboard of claim 1, wherein the inflatable keys are one of individually molded and extruded, and individually sealed to the base.

12. The inflatable keyboard of claim 1, further comprising:
    a plurality of valves communicating with respective separate air tight compartments of each inflatable key;
    pressure transducers concentrically surrounding each valve within each air tight compartment; and
    thin film signal conductors connecting to the pressure transducers and an output,
    wherein when a user depresses the inflatable keys, the pressure transducers provide a signal to the output, via the thin film signal conductors, and
    wherein the output provides the signal to an external computer system.

13. The inflatable keyboard of claim 1, wherein:
    the inflatable keys are extended in an upright position and are rigid when the inflatable keys are inflated, and
    the inflatable keys form a substantially flat surface with the base when the inflatable keys are deflated.

14. The inflatable keyboard of claim 1, further comprising pressure transducers within each air tight compartment, the pressure transducers providing a signal to an output in response to depressing the inflatable keys.

15. The inflatable keyboard of claim 14, wherein the pressure transducers include means for controlling touch sensitivity so when the inflatable keys are depressed with a certain force, the pressure transducers provide a signal to an output in response to the certain force.

16. The inflatable keyboard of claim 1, wherein:
    the gas conduit system is divided in a plurality of sections corresponding a plurality of sections of the base, a plurality of inflatable keys correspond to each section of the base and each section of the gas conduit system, and sequentially providing gas to each gas conduit system section individually so as to inflate the plurality of inflatable keys corresponding to the section of the base in which the gas is being supplied.

17. An inflatable keyboard comprising:

a polymer base;

a plurality of inflatable keys arranged on a preformed mold and hermetically sealed to the base, each inflatable key forming a separate air tight compartment on the base when the preformed mold is hermetically sealed to the base;

a conduit communicating with the separate air tight compartments of each inflatable key and being embedded in the base; and signal means for providing a signal from the inflatable keys to an output when a user depresses the inflatable keys, wherein each separate air tight compartment is at least individually inflated by the conduit.

18. The inflatable keyboard of claim 17, wherein the signal means includes:

pressure transducers within each air tight compartment; and signal conductors connecting to the pressure transducers and an output, wherein when a user depresses the inflatable keys, the pressure transducers provide a signal to the output, via the signal conductors.

19. The inflatable keyboard of claim 17, further including a plurality of valves communicating with respective separate air tight compartments of each inflatable key and the conduit, wherein the pressure transducers are concentrically positioned around each valve within each air tight compartment.

20. The inflatable keyboard of claim 17, wherein the pressure transducers and the signal conductors are embedded in the polymer base.

* * * * *